(12) United States Patent
Katrak et al.

(10) Patent No.: US 8,365,037 B2
(45) Date of Patent: Jan. 29, 2013

(54) VEHICLE PARAMETER INFRASTRUCTURE SECURITY STRATEGY

(75) Inventors: Kerfegar K. Katrak, Fenton, MI (US); Scott A. McCullough, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1793 days.

(21) Appl. No.: 11/619,203

(22) Filed: Jan. 3, 2007

(65) Prior Publication Data
US 2008/0157951 A1 Jul. 3, 2008

(51) Int. Cl.
*H03M 13/00* (2006.01)

(52) U.S. Cl. ............................. 714/758; 714/807; 701/29

(58) Field of Classification Search .................. 714/758, 714/807; 701/29
See application file for complete search history.

(56) References Cited

U.S. PATENT DOCUMENTS

| | | | |
|---|---|---|---|
| 5,862,502 A | 1/1999 | Giers | |
| 5,907,563 A * | 5/1999 | Takeuchi et al. ............... | 714/751 |
| 6,073,713 A * | 6/2000 | Brandenburg et al. .... | 180/65.22 |
| 6,430,662 B1 | 8/2002 | Hurich et al. | |
| 6,546,455 B1 | 4/2003 | Hurich et al. | |
| 6,892,131 B2 * | 5/2005 | Coffee et al. ................. | 701/482 |
| 7,489,903 B2 * | 2/2009 | Johansson et al. ......... | 455/67.11 |
| 7,702,442 B2 * | 4/2010 | Takenaka ........................ | 701/48 |
| 7,707,478 B2 * | 4/2010 | Jiang .............................. | 714/758 |
| 7,805,656 B2 * | 9/2010 | Jiang .............................. | 714/758 |
| 2010/0235680 A1 | 9/2010 | Fey et al. | |

FOREIGN PATENT DOCUMENTS

| | | |
|---|---|---|
| DE | 4341082 A1 | 6/1995 |
| DE | 19839680 A1 | 3/2000 |
| DE | 19931184 A1 | 1/2001 |
| DE | 102006036384 A1 | 3/2007 |

OTHER PUBLICATIONS

German Office Action, dated Sep. 28, 2011, for German Patent Application No. 10 2008 003 023.6.
German Office Action for German Application No. 1002008 003 023.6-55 mailed Dec. 20, 2010.
Das, J. "Principles of Digital Communication," New York, John Wiley & Sons, 1986. pp. 414-415 and 424-426.
Proakis, J.G. "Digital Communications," New York, McGraw-Hill, 1983. pp. 246-249.

* cited by examiner

*Primary Examiner* — Esaw Abraham
(74) *Attorney, Agent, or Firm* — Ingrassia Fisher & Lorenz P.C.

(57) ABSTRACT

A method and apparatus is provided for improving integrity in data representing a plurality of condition states of a variable, including the steps of determining which condition states are operationally incompatible with one another, and generating an array of transformed integer values including a separate integer value for each condition state. The transformed integer value for each condition state in binary form is at least two bit errors removed from any transformed integer value for an identified incompatible condition state in binary form.

20 Claims, 6 Drawing Sheets

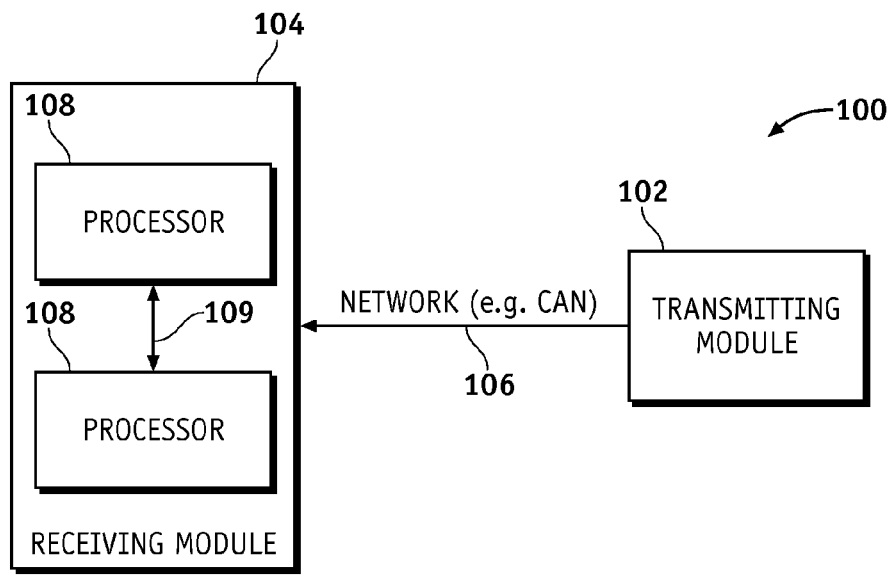
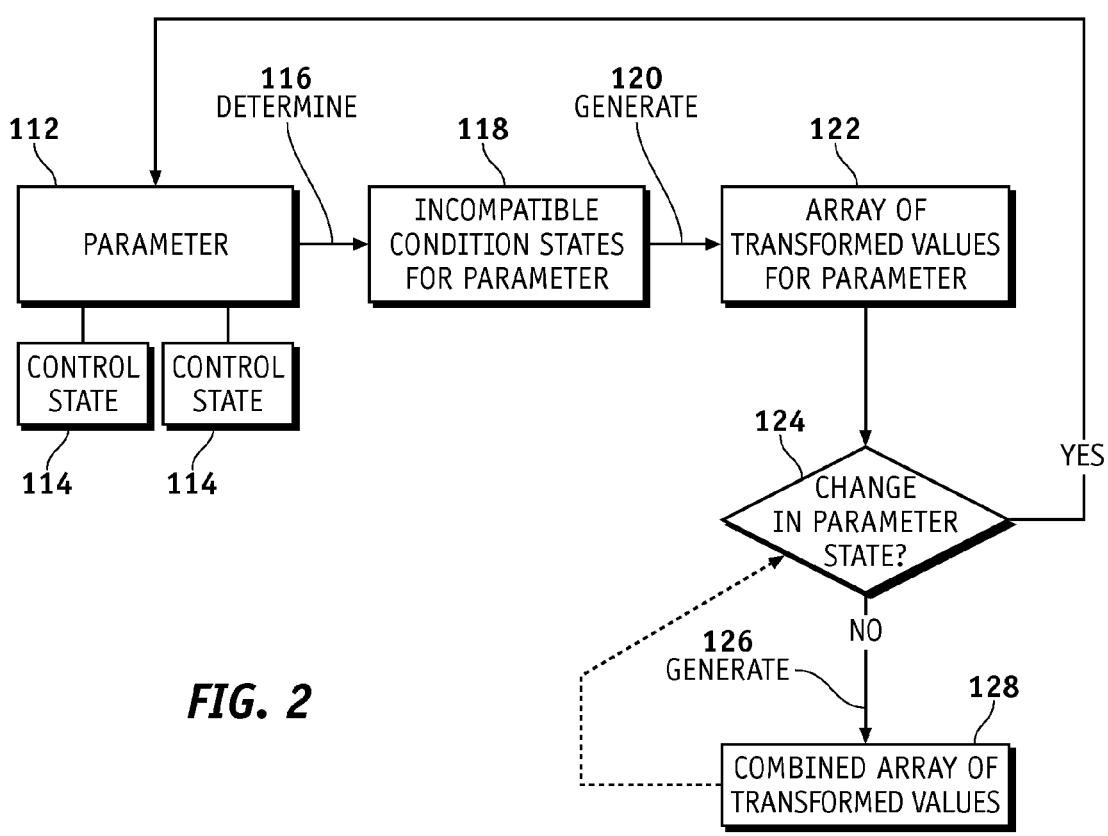
*FIG. 1*
PRIOR ART
*FIG. 2*

| POWER MODE | PRESET VALUE | PROPOSED VALUES | | | | |
|---|---|---|---|---|---|---|
| OFF NO FAILURE | 1 | 5 | 0 | 1 | 0 | 1 |
| OFF | FAILURE | 13 | 1 | 1 | 0 | 1 |
| OFF | FAILURE | 1 | 0 | 0 | 0 | 1 |
| OFF | FAILURE | 7 | 0 | 1 | 1 | 1 |
| OFF | FAILURE | 4 | 0 | 1 | 0 | 0 |
| OFF | DEFAULT STATES=0,2,8,11,12,14,15 | | | | | |

| POWER MODE | PRESET VALUE | PROPOSED VALUES | | | | |
|---|---|---|---|---|---|---|
| ACCESSORY NO FAILURE | 0 | 6 | 0 | 1 | 1 | 0 |
| ACCESSORY | FAILURE | 14 | 1 | 1 | 1 | 0 |
| ACCESSORY | FAILURE | 2 | 0 | 0 | 1 | 0 |
| ACCESSORY | FAILURE | 4 | 0 | 1 | 0 | 0 |
| ACCESSORY | FAILURE | 7 | 0 | 1 | 1 | 1 |
| ACCESSORY | DEFAULT STATES=0,1,3,8,11,12,13,15 | | | | | |

| POWER MODE | PRESET VALUE | PROPOSED VALUES | | | | |
|---|---|---|---|---|---|---|
| RUN NO FAILURE | 2 | 10 | 1 | 0 | 1 | 0 |
| RUN | FAILURE | 2 | 0 | 0 | 1 | 0 |
| RUN | FAILURE | 14 | 1 | 1 | 1 | 0 |
| RUN | FAILURE | 8 | 1 | 0 | 0 | 0 |
| RUN | FAILURE | 11 | 1 | 0 | 1 | 1 |
| RUN | DEFAULT STATES=0,1,3,4,7,12,13,15 | | | | | |

| POWER MODE | PRESET VALUE | PROPOSED VALUES | | | | |
|---|---|---|---|---|---|---|
| CRANK NO FAILURE | 3 | 9 | 1 | 0 | 0 | 1 |
| CRANK | FAILURE | 1 | 0 | 0 | 0 | 1 |
| CRANK | FAILURE | 13 | 1 | 1 | 0 | 1 |
| CRANK | FAILURE | 11 | 1 | 0 | 1 | 1 |
| CRANK | FAILURE | 8 | 1 | 0 | 0 | 0 |
| CRANK | DEFAULT STATES=0,2,3,4,7,12,14,15 | | | | | |

| ENGINE RUN STATUS | PRESET VALUE | PROPOSED VALUES | | | | |
|---|---|---|---|---|---|---|
| NOT RUNNING | 0 | 3 | 0 | 1 | 1 | 1 |
| RUNNING & IDLING | 1 | 5 | 1 | 0 | 1 | 1 |
| RUNNING & NOT IDLING | 2 | 6 | 1 | 1 | 1 | 0 |
| ENGINE RUN STATUS | DEFAULT STATES=0,2,3,4,7 | | | | | |

FIG. 7

| TRANS. GEAR STATUS | PRESET VALUE | PROPOSED VALUES | | | |
|---|---|---|---|---|---|
| NOT RUNNING | 8 | 3 | 0 | 1 | 1 |
| ANY GEAR EXCEPT REVERSE | 0 TO 7, 9, 10 | 5 | 1 | 0 | 1 |
| ENGINE RUN STATUS | DEFAULT STATES=0,1,2,3,4,6,7 | | | | |

FIG. 9

| POWER MODE | PROPOSED VALUES | ENGINE RUN STATUS | PROPOSED VALUES | STABILITRAK STATE | TRANS. GEAR STATUS | PROPOSED VALUES |
|---|---|---|---|---|---|---|
| RUN | 10 | RUNNING & IDLING | 5 | STABILITRAK ENABLED REVERSE MAP SELECTED | REVERSE | 3 |
| RUN | 10 | RUNNING & NOT IDLING | 6 | STABILITRAK ENABLED REVERSE MAP SELECTED | REVERSE | 3 |
| RUN | 10 | RUNNING & IDLING | 5 | STABILITRAK ENABLED FORWARD MAP/S SELECTED | ANY GEAR EXCEPT REVERSE | 5 |
| RUN | 10 | RUNNING & NOT IDLING | 6 | STABILITRAK ENABLED FORWARD MAP/S SELECTED | ANY GEAR EXCEPT REVERSE | 5 |

| POWER MODE | PROPOSED VALUES | ENGINE RUN STATUS | PROPOSED VALUES | STABILITRAK STATE |
|---|---|---|---|---|
| OFF | 5 | NOT RUNNING | 3 | STABILITRAK DISABLED |
| OFF | 5 | RUNNING & IDLING | 5 | STABILITRAK DISABLED |
| OFF | 5 | RUNNING & NOT IDLING | 6 | STABILITRAK DISABLED |
| ACCESSORY | 6 | NOT RUNNING | 3 | STABILITRAK DISABLED |
| ACCESSORY | 6 | RUNNING & IDLING | 5 | STABILITRAK DISABLED |
| ACCESSORY | 6 | RUNNING & NOT IDLING | 6 | STABILITRAK DISABLED |
| RUN | 10 | NOT RUNNING | 3 | STABILITRAK DISABLED |
| RUN | 10 | RUNNING & IDLING | 5 | STABILITRAK ENABLED |
| RUN | 10 | RUNNING & NOT IDLING | 6 | STABILITRAK ENABLED |
| CRANK | 9 | NOT RUNNING | 3 | STABILITRAK DISABLED |
| CRANK | 9 | RUNNING & IDLING | 5 | STABILITRAK DISABLED |
| CRANK | 9 | RUNNING & NOT IDLING | 6 | STABILITRAK DISABLED |

*FIG. 8*

VEHICLE PARAMETER INFRASTRUCTURE SECURITY STRATEGY

TECHNICAL FIELD

The present invention generally relates to control systems found in automobiles and other vehicles, and more particularly relates to methods and systems for ensuring the security of data processed within a vehicle-based control system.

BACKGROUND OF THE INVENTION

Modern automobiles and other vehicles may include sophisticated on-board computer systems that monitor the status and performance of various components of the vehicle (for example, the vehicle engine, transmission, gears, brakes, suspension, and/or other components of the vehicle). Many of these computer systems may also adjust or control one or more operating parameters of the vehicle in response to operator instructions, road or weather conditions, operating status of the vehicle, and/or other factors.

Various types of microcontroller or microprocessor-based controllers found on many conventional vehicles may include supervisory control modules (SCMs), engine control modules (ECMs), controllers for various vehicle components (for example, anti-lock brakes, electronically-controlled transmissions, or other components), among other modules. Such controllers are typically implemented with any one of numerous types of microprocessors, microcontrollers or other control devices that appropriately receive data from one or more sensors or other sources, process the data to create suitable output signals, and provide the output signals to control actuators, dashboard indicators and/or other data responders as appropriate. The various components of a vehicle-based control system typically inter-communicate with each other and/or with sensors, actuators and the like across any one of numerous types of serial and/or parallel data links. Today, data processing components within a vehicle are commonly interlinked by a data communications network such as a control area network (CAN), an example of which is described in ISO Standard 11898-1 (2003).

Because vehicles may now process relatively large amounts of digital data during operation, it can be an engineering challenge to ensure that the data processed is accurate and reliable. Though unlikely, it is postulated that as digital data is stored, processed, consumed and/or shared between or within the various data processing components of a vehicle, for example, bit errors and the like can occur due, for example, to environmental factors, hardware faults, data transmission issues and other postulated causes. As a result, various techniques have been developed to ensure the integrity of data processed and transferred within the vehicle.

Nevertheless, it remains desirable to formulate systems and methods for ensuring data accuracy within vehicle control systems, and/or for minimizing any adverse effects from any potential data errors. Other desirable features and characteristics will become apparent from the subsequent detailed description and the appended claims, taken in conjunction with the accompanying drawings and the foregoing technical field and background.

SUMMARY OF THE INVENTION

A method is provided for improving integrity in data representing a plurality of condition states of a variable. In one embodiment, and by way of example only, the method comprises the steps of determining which condition states are operationally incompatible with one another, and generating an array of transformed integer values comprising a separate integer value for each condition state. The transformed integer value for each condition state in binary form is at least two bit errors removed from any transformed integer value for an identified incompatible condition state in binary form.

In another embodiment, and by way of example only, the data represents a plurality of condition states of a plurality of variables, the variables include at least a vehicle power mode variable (with condition states including at least power off, run, accessory, and crank), an engine run status variable (with condition states including at least not running, running and idling, and running and not idling), and a transmission gear status variable (with condition states including at least reverse and any gear except reverse), and the method comprises the steps of determining which condition states are operationally incompatible with one another, and generating an array of transformed integer values comprising an integer value for each condition state. The transformed integer values are different for each condition state of the power mode variable, for each condition state of the engine run status variable, and for each condition state of the transmission gear status variable. The transformed integer value for each condition state in binary form is at least two bit errors removed from any transformed integer value for an identified incompatible condition state in binary form.

An apparatus is provided for improving integrity in data representing a plurality of condition states of a variable. In one embodiment, and by way of example only, the apparatus comprises means for determining which condition states are operationally incompatible with one another, and means for generating an array of transformed integer values comprising a separate integer value for each condition state. The transformed integer value for each condition state in binary form is at least two bit errors removed from any transformed integer value for an identified incompatible condition state in binary form.

DESCRIPTION OF THE DRAWINGS

The present invention will hereinafter be described in conjunction with the following drawing figures, wherein like numerals denote like elements, and FIG. 1 depicts an exemplary control system for a vehicle;

FIG. 2 depicts a data transformation method for improving integrity in data representing a plurality of condition states of a variable;

FIG. 5 depicts an embodiment of an array of transformed values for a vehicle power mode parameter generated using the method of FIG. 2 and utilized in the method of FIGS. 3-4;

FIG. 6 depicts an embodiment of an array of transformed values for an engine run status parameter generated using the method of FIG. 2 and utilized in the method of FIGS. 3-4;

FIG. 7 depicts an embodiment of an array of transformed values for a transmission gear status parameter generated using the method of FIG. 2 and utilized in the method of FIGS. 3-4;

FIG. 8 depicts an embodiment of the step of FIG. 3; and

FIG. 9 depicts another embodiment of the step of FIG. 3.

DESCRIPTION OF AN EXEMPLARY EMBODIMENT

Figure 3:
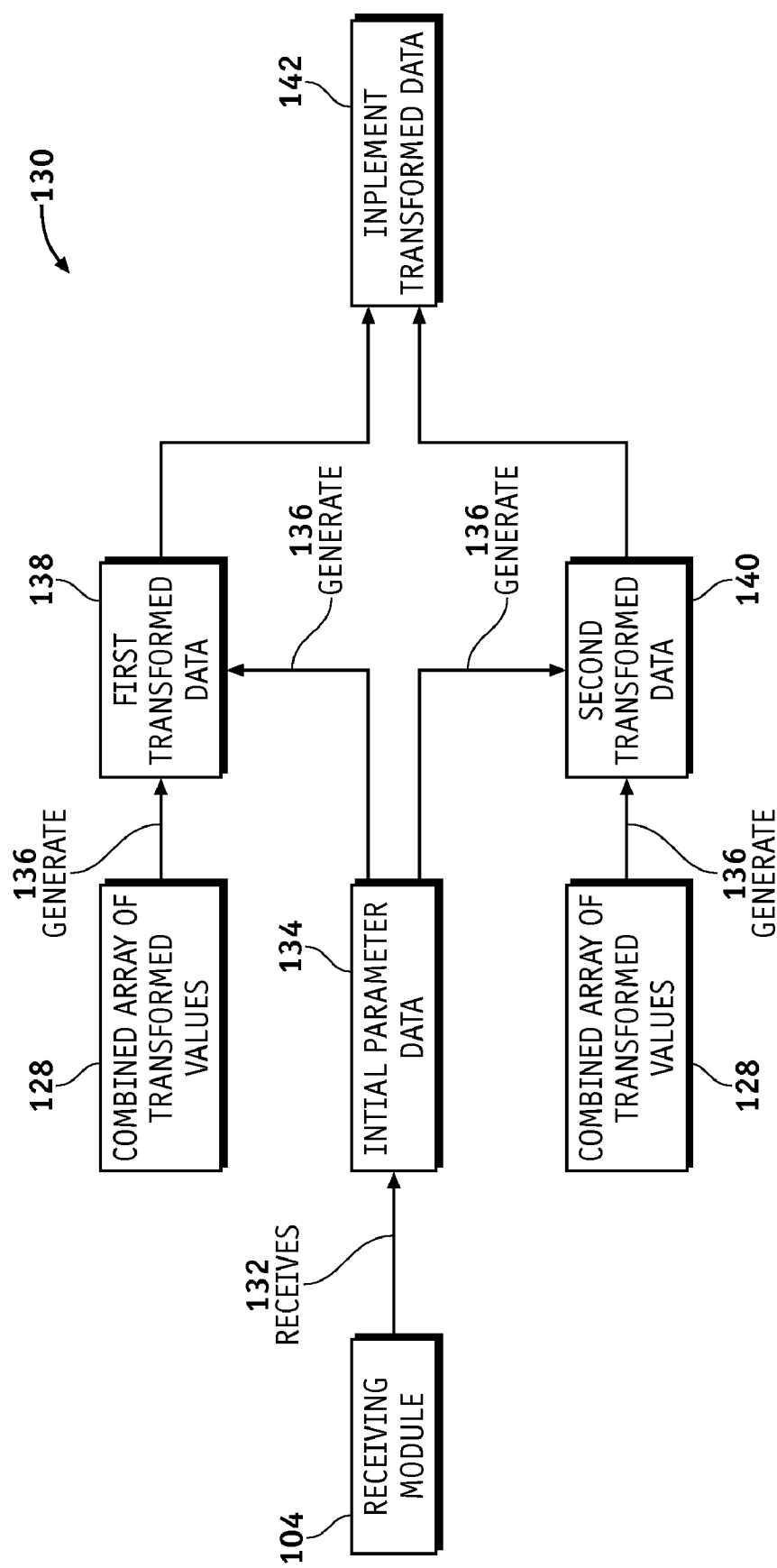
FIG. 3 depicts a data application method utilizing an array of transformed values generated in the method of FIG. 2.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 1 depicts an exemplary control system 100 for a vehicle. As depicted in FIG. 1, the control system 100 includes a plurality of modules, including any number of transmitting modules 102 and receiving modules 104, which transmit information via a data network 106. The transmitting and receiving modules 102, 104 may be any one of numerous types of systems or devices having any one of numerous types of data processing hardware, such as any one of numerous types of microprocessors or microcontrollers. Moreover, it will be appreciated that there can be various numbers of transmitting modules 102 and receiving modules 104 in the control system 100, and that certain modules may function as both a transmitting module 102 and a receiving module 104 in various situations. The network 106 is preferably a control area network (CAN) or bus, or some other data network connection.

Preferably at least one or more of the receiving modules 104 includes one or more redundant processors 108, interconnected by a conventional data connection 109 as appropriate. In various embodiments, connection 109 is a UART or other internal connection (e.g., a bus connection) within the receiving module(s) 104.

One or more receiving module(s) 104 can receive and process data regarding various vehicle operation parameters, such as power mode, engine running status, and transmission gear status, along with any of a number of other different types of parameters or other variables. Preferably such parameters are assigned specific values corresponding with different parameter conditions.

For example, in the control system 100, the power mode parameter takes a value of 0 when in the "off" mode, a value of "1" when in the accessory mode, a value of "2" when in the run mode, and a value of "3" when in the crank mode. In the same control system 100, the engine run status parameter takes a value of "0" when the engine is not running, a value of "1" when the engine is running and idling, and a value of "2" when the engine is running and not idling. Meanwhile, the transmission gear status parameter takes a value of "8" while in reverse, and a value in the range of 0-7, 9, and 10 when in any of the forward or neutral gears (hereafter referred to as "any gear except reverse").

FIG. 2 depicts a data transformation method 110 for improving integrity in data representing one or more parameters 112, and the plurality of condition states 114 thereof. The data transformation method 110 involves transforming such data values, and thereby reducing the risks and/or the potential consequences of any failures pertaining to such data values. As depicted in FIG. 2, the data transformation method 110 is preferably used in connection with data for one or more vehicle parameters 112, each having a plurality of possible condition states 114.

As depicted in FIGS. 5-9, the parameters 112 may include vehicle operation parameters such as power mode (with condition states 114 including off, run, accessory, and crank), engine run status (with condition states 114 including engine not running, engine running and idling, and engine running and not idling), and transmission gear status (with condition states 114 including at least reverse, and any gear except reverse). However, it will be appreciated that the parameters 112 and the condition states 114 can represent any number of different parameters pertaining to vehicles, and/or any number of different other types of variables.

Returning now to FIG. 2, in step 116 there is a determination, with respect to a particular parameter 112, as to which condition states 114 are incompatible with one another, and labeling them as incompatible condition states 118. Next, in step 120, an array of transformed values 122 is generated for a particular parameter 112. The array of transformed values 122 preferably includes a separate integer value for each condition state 114 of the particular parameter 112. The array of transformed values 122 is preferably generated such that each condition state 114 in binary form is at least two bit errors removed from any transformed integer value for an identified incompatible condition state 118 in binary form.

FIGS. 5-7 depict preferred embodiments of the arrays of transformed values 122 for the above-mentioned vehicle power mode, engine run status, and transmission gear status parameters 112. In a preferred embodiment for the power mode parameter 112 shown in FIG. 5, the off condition state 114 is assigned a value of 5, the run condition state 114 is assigned a value of 10, the accessory condition state 114 is assigned a value of 6, and the crank condition state 114 is assigned a value of 9. As shown in FIG. 5, the assigned values for each of these incompatible condition states 118 in binary form are at least two bit errors removed from one another. It will be appreciated that other embodiments can similarly be used to detect nibble failures, or failures at other levels, for other incompatible condition states 118.

Moreover, also as shown in FIG. 5, preferably any other values for the parameters 112, other than recognized condition states 114, are assigned values that are a single bit error removed from the assigned value of the corresponding condition state 114 in binary form, so that any such errors can be more easily diagnosed. For example, with respect to the off condition state 114 (which is assigned a value of 5), the corresponding non-recognized states are assigned values of 13, 1, 7, and 4, as shown in FIG. 5. Accordingly, in the event that any one of these non-recognized states occurs instead of the recognized off condition state 114, the error will have resulted from a single, identifiable bit that differs from the off condition state 114.

Similarly, in a preferred embodiment for the engine run status parameter 112 shown in FIG. 6, the not running condition state 114 is assigned a value of 3, the running and idling condition state 114 is assigned a value of 5, and the running and not idling condition state 114 is assigned a value of 6. As shown in FIG. 6, the assigned values for each of these incompatible condition states 118 in binary form are at least two bit errors removed from one another.

Similarly, in a preferred embodiment for the transmission gear status parameter 112 shown in FIG. 7, the reverse condition state 114 is assigned a value of 3, and the any gear except reverse condition state 114 is assigned a value of 5. As shown in FIG. 7, the assigned values for each of these incompatible condition states 118 in binary form are at least two bit errors removed from one another.

Returning now to FIG. 2, in step 124 it is determined whether there has been any change in a parameter state, and/or whether there has been any other event that would require that steps 116-122 be repeated. If the answer to step 124 is yes, then steps 116-124 are repeated. Then, the process proceeds to step 126. In step 126, the individual arrays of transformed values 122 for each parameter 112 are then combined to form a combined array of transformed values 128. Then, optionally the process may return to step 124, so that steps 116-122 can be repeated when there has been any change in a parameter state, and/or whether there has been any other event that would require that these steps be repeated. Alternatively, in certain embodiments steps 116-

122, and/or steps 116-128, may be continually repeated, without the need for the query in step 124.

The data processing method 110 depicted in FIG. 2 is preferably conducted for a plurality of different parameters 112. In a preferred embodiment, steps 116-128 as described above are conducted simultaneously for a plurality of different parameters 112. However, it will be appreciated that in certain embodiments these steps may differ, or may be conducted at different times, for different parameters 112.

It will also be appreciated that, regardless of the number of parameters 112 and any differences in the treatment thereof, certain steps in the data transformation method 110 may vary, and/or may occur in a different order. For example in certain embodiments, steps 124 and/or 126 may not be necessary, as the combined array of transformed values 128 may be generated in step 120, and/or because the desired end result of the data transformation process 110 in certain embodiments may be the array(s) of transformed values 122 for each parameter 112 rather than the combined array of transformed values 128. It will also be appreciated that the array(s) of transformed values 122 and/or the combined array of transformed values 128 may assign particular integer values to condition states 114 of multiple parameters 112, for example as depicted in FIGS. 5-9, among various other potential variations of the data transformation method 110. However, regardless of the particular embodiment of the data transformation method 110, the array(s) of transformed values 122 and/or the combined array of transformed values 128 generated therein can be used to transform and secure data, as described below in connection with the data application method 130.

Turning now to FIG. 3, a preferred embodiment of the data application method 130 is shown. In step 132, the receiving module 104 receives initial parameter data 134, preferably from the network 106 of FIG. 1. However, it will be appreciated that the data application method 130 may be implemented within or among any number of receiving modules 104, and/or across some or all of the control system 100. Regardless of how and where the data application method 130 is implemented, the initial parameter data 134 preferably includes values regarding the current condition state 114 of one or more parameters 112, for example in the format described above in connection with the control system 100.

Next, in step 136, first transformed data 138 and second transformed data 140 are generated, preferably from the initial parameter data 134 and the combined array of transformed values 128. However, as mentioned above, it will be appreciated that one or more arrays of transformed values 122 for individual parameters 112 may be used instead of, or in addition, to one or more combined arrays of transformed values 128. Regardless of the particular data transformation arrays utilized, the first and second transformed data 138, 140 are generated by identifying the transformed integer value from the combined array of transformed values 128 corresponding with each of the values for condition states 114 in the initial parameter data 134, and preferable storing these identified values in the first and second transformed data 138, 140.

Preferably the first and second transformed data 138, 140 are generated independently of one another, thereby serving as a redundant check on the accuracy of the data application method 130. However, it will be appreciated that the first and second transformed data 138, 140 can also be generated with some dependence on one another, or that in certain embodiments it may be unnecessary to generate the second transformed data 140. Next, in step 142, the first and second transformed data 138, 140 are implemented, as discussed below.

Figure 4:
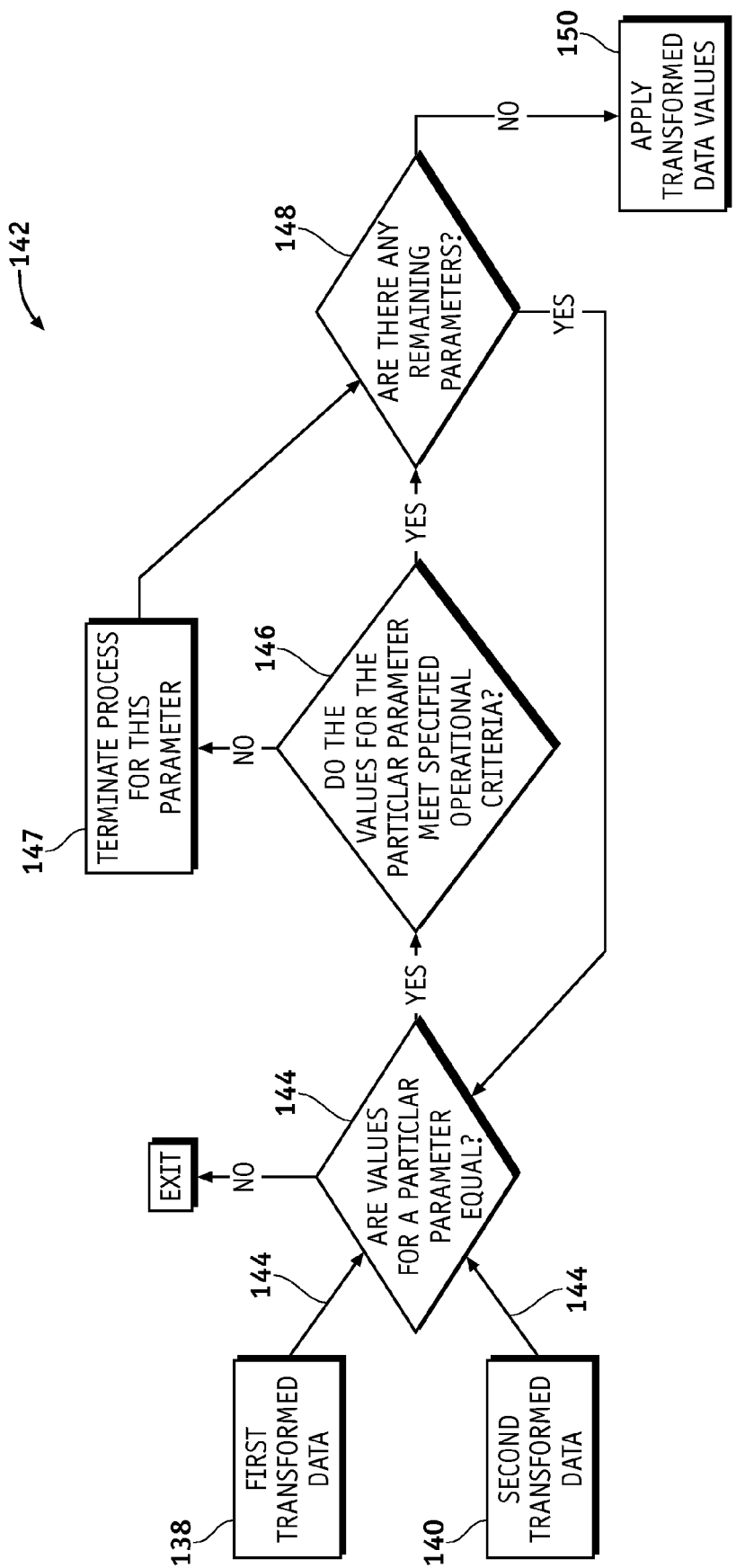
FIG. 4 depicts an embodiment of a step of the method of FIG. 3, involving implementation of transformed data.

FIG. 4 depicts one embodiment of step 142, implementation of the transformed data. First, in step 144, the first transformed data 138 is compared with the second transformed data 140 at least for a particular parameter 112. If the values are unequal, then the process terminates at least for the particular parameter 112 tested, and preferably stored values are used for such particular parameter 112, rather than the values from the initial parameter data 134. On the other hand, if the values from the first and second transformed data 138, 140 are determined in step 144 to be equal, then the process proceeds to step 146, as described below.

In step 146, it is determined whether or not the values for the particular parameter 112 being tested meet certain specified operational criteria, either alone or in connection with one or more additional parameters 112. If it is determined in step 146 that the specified operational criteria are not met, then, in step 147, the process terminates with respect to this particular parameter 112, and/or other appropriate measures are taken, such as disabling or adjusting the control system 100, before the process proceeds to step 148 for any remaining parameters 112. Otherwise, if it is determined in step 146 that the operational criteria have been met, then the process proceeds directly to step 148. In step 148, it is determined whether there are any additional parameters 112 to test. If there are additional parameters 112, then steps 144-148 repeat for any additional parameters 112, either alone or in combination with other parameters 112. Next, in step 150, the transformed data meeting the specified operational criteria is then applied in the operation of the vehicle, for example by allowing the control system 100 to continue to operate, and/or through appropriate operation of and/or adjustments to the vehicle, and/or modules and/or other components thereof.

In certain embodiments, step 142, and/or certain elements thereof, can be redundantly implemented for even further improvement of data integrity. For example, step 142 can be repeated and/or implemented simultaneously for dual paths of a critical variable, and/or for a comparison between two critical single or dual path variables. It will be appreciated that various combinations of the elements of step 142, and/or other steps, can be redundantly implemented in any one of a number of different manners to provide such further improvement of data integrity.

FIGS. 8-9 depict preferred embodiments of step 142, implementation of the transformed data. As shown in FIG. 8, the control system 100, for example, is a current version of the Stabilitrak® 3.0 control system 100, and is preferably disabled upon encountering any of the following combinations of condition states 114 of the power mode and the engine run status parameters 112:

Power Mode (Off) and Engine Run Status (Not Running);
Power Mode (Off) and Engine Run Status (Running and Idling);
Power Mode (Off) and Engine Run Status (Running and Not Idling);
Power Mode (Accessory) and Engine Run Status (Not Running);
Power Mode (Accessory) and Engine Run Status (Running and Idling);
Power Mode (Accessory) and Engine Run Status (Running and Not Idling);
Power Mode (Run) and Engine Run Status (Not Running);
Power Mode (Crank) and Engine Run Status (Not Running);

Power Mode (Crank) and Engine Run Status (Running and Idling); or

Power Mode (Crank) and Engine Run Status (Running and Not Idling).

Conversely, the control system 100 preferably remains enabled upon encountering any of the following combinations of condition states 114 of the power mode and the engine run status parameters 112:

Power Mode (Run) and Engine Run Status (Running and Idling); or

Power Mode (Run) and Engine Run Status (Running and Not Idling).

As shown in FIGS. 8-9, step 142, implementation of the transformed data, can also be dependent upon three or more parameters 112. As shown in FIG. 8 and mentioned above, the control system 100 is preferably disabled upon encountering the run condition state 114 of the power mode parameter 112.

On the other hand, as shown in FIG. 9, the control system 100 is preferably enabled with a reverse map selection upon encountering any of the following combinations of condition states 114 of the power mode, engine run status, and transmission gear status parameters 112:

Power Mode (Run), Engine Run Status (Running and Idling), and Transmission Gear Status (Reverse); or Power Mode (Run), Engine Run Status (Running and Not Idling), and Transmission Gear Status (Reverse).

Conversely, the control system 100 preferably remains enabled with a forward map selection upon encountering any of the following combinations of condition states 114 of the power mode, engine run status, and transmission gear status parameters 112:

Power Mode (Run), Engine Run Status (Running and Idling), and Gear Transmission Status (Any Gear Except Reverse); or Power Mode (Run), Engine Run Status (Running and Not Idling), and Transmission Gear Status (Any Gear Except Reverse).

Moreover, as mentioned above, it will further be appreciated that the data transformation method 110 and the data application method 130 can be applied to any of numerous different parameters 112 or other variables, for example various other parameters 112 pertaining to vehicle stability and/or operation and/or any of a number of different types of parameters 112 and/or other variables, and in any number of different contexts and circumstances.

It will also be appreciated that, in certain types of present and/or future vehicle architecture, some or all of the transformed values 122 may be sent directly by a processor 108, and/or device(s), that reads and/or determines initial, non-transformed values for the parameters 112, for example prior to sending the information on the network 106. Such an implementation could potentially reduce time or other overhead associated with transforming these values within various modules, by placing the transformed values 122 on the network 106.

It will similarly be appreciated that step 142, implementation of the transformed data, and/or various other steps and features described above, may also take different embodiments, for example corresponding with different variables, contexts, and circumstances. However, regardless of the particular implementation, the data transformation method 110 and the data application method 130 can help to improve integrity in data, for example by reducing the probability and/or consequences of potential bit errors between incompatible condition states 118.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for improving integrity in data representing a plurality of condition states of a variable, the method comprising the steps of:

determining which condition states are operationally incompatible with one another using one or more processors; and generating an array of transformed integer values using the one or more processors by changing initial integer values of each of the condition states to transformed integer values for the condition states, such that the transformed integer values for the condition states comprise a separate transformed integer value for each condition state, such that the transformed integer value for each condition state in binary form is at least two bit errors removed from any transformed integer value for an identified incompatible condition state in binary form.

2. The method of claim 1, wherein the condition states are determined to be operationally incompatible with one another if the condition states cannot occur together at the same time during operation of the vehicle.

3. The method of claim 1, further comprising the steps of:

redundantly identifying the transformed integer value from the generated array of transformed integer values corresponding with each of the one or more initial values; and comparing the redundantly identified transformed integer values from step (e) with the corresponding identified transformed integer values from step (d).

4. The method of claim 3, further comprising the step of:

taking remedial action if one or more of the redundantly identified transformed integer values is not equal to the corresponding identified transformed integer value.

5. The method of claim 1, wherein:

the transformed integer values for at least two of the identified incompatible condition states include at least a 5 and a 6.

6. The method of claim 1, wherein the transformed integer values for at least two of the identified incompatible condition states are selected from the group consisting of: 5, 6, 9, and 10.

7. The method of claim 1, wherein the transformed integer values for at least two of the identified incompatible condition states are selected from the group consisting of: 3, 5, and 6.

8. The method of claim 1, wherein the data further represents a plurality of condition states of at least one additional variable, the method further comprising the steps of:

determining which condition states of the at least one additional variable are operationally incompatible with one another; and generating an array of transformed integer values comprising an integer value for each condition state of the at least one additional variable, such that:

each condition state of a particular additional variable has a separate transformed integer value; and the transformed integer value for each condition state of an additional variable in binary form is at least two bit errors removed from any transformed integer value for an identified incompatible condition state in binary form.

9. The method of claim 8, wherein the variable is vehicle power mode (with condition states including at least power off, run, accessory, and crank), the additional variables include at least engine run status (with condition states including at least not running, running and idling, and running and not idling), and transmission gear status (with condition states including at least reverse and any gear except reverse), and wherein:
the transformed integer values for the condition states of the power mode variable are selected from the group consisting of: 5, 6, 9, and 10;
the transformed integer values for the condition states of the engine run status variable are selected from the group consisting of: 3, 5, and 6; and
the transformed integer values for the condition states of the transmission gear status variable are selected from the group consisting of: 3 and 5.

10. The method of claim 9, wherein:
the transformed integer value for the power off condition state of the power mode variable is 5;
the transformed integer value for the run condition state of the power mode variable is 10;
the transformed integer value for the accessory condition state of the power mode variable is 6;
the transformed integer value for the crank condition state of the power mode variable is 9;
the transformed integer value for the not running condition state of the engine run status variable is 3;
the transformed integer value for the running and idling condition state of the engine run status variable is 5;
the transformed integer value for the running and not idling condition state of the engine run status variable is 6;
the transformed integer value for the reverse condition state of the transmission gear status variable is 3; and
the transformed integer value for the any gear except reverse condition state of the transmission gear status variable is 5.

11. A method for improving integrity in data representing a plurality of condition states of a plurality of variables, the variables including at least a vehicle power mode variable (with condition states including at least power off, run, accessory, and crank), an engine run status variable (with condition states including at least not running, running and idling, and running and not idling), and a transmission gear status variable (with condition states including at least reverse and any gear except reverse), and wherein the method comprises the steps of:
receiving initial values representing a plurality of condition states for a variable representing a vehicle operational parameter; and
generating an array of transformed integer values using a processor by changing the initial values of each of the condition states to transformed integer values for the condition states, such that the transformed integer values for the condition states comprise a separate transformed integer value for each condition state, such that:
the transformed integer values are different for each condition state of the variable; and
the transformed integer value for each condition state in binary form is at least two bit errors removed from the transformed integer values for each of the other condition states in binary form.

12. The method of claim 11, wherein each of the condition states are operational inconsistent with one another.

13. The method of claim 11, wherein the variable is selected from the group consisting of a power mode of the vehicle, an engine run status of the vehicle, and a transmission gear status of the vehicle.

14. The method of claim 13, further comprising the step of: taking remedial action if one or more of the redundantly identified transformed integer values is not equal to the corresponding identified transformed integer value wherein the transformation is performed separately for each of the following variables: the power mode of the vehicle, the engine run status of the vehicle, and the transmission gear status of the vehicle.

15. The method of claim 14, wherein:
the transformed integer values for the condition states of the power mode variable are selected from the group consisting of: 5, 6, 9, and 10;
the transformed integer values for the condition states of the engine run status variable are selected from the group consisting of: 3, 5, and 6; and
the transformed integer values for the condition states of the transmission gear status variable are selected from the group consisting of: 3 and 5.

16. The method of claim 15, wherein:
the transformed integer value for the power off condition state of the power mode variable is 5;
the transformed integer value for the run condition state of the power mode variable is 10;
the transformed integer value for the accessory condition state of the power mode variable is 6;
the transformed integer value for the crank condition state of the power mode variable is 9;
the transformed integer value for the not running condition state of the engine run status variable is 3;
the transformed integer value for the running and idling condition state of the engine run status variable is 5;
the transformed integer value for the running and not idling condition state of the engine run status variable is 6;
the transformed integer value for the reverse condition state of the transmission gear status variable is 3; and
the transformed integer value for the any gear except reverse condition state of the transmission gear status variable is 5.

17. An apparatus for improving integrity in data representing a plurality of condition states of a variable, the apparatus comprising:
means for receiving one or more initial values representing the condition states of the variable;
means for determining which condition states are operationally incompatible with one another; and
means for generating an array of transformed integer values by changing the initial values, such that the transformed integer values comprise a separate integer value for each condition state, such that the transformed integer value for each condition state in binary form is at least two bit errors removed from any transformed integer value for an identified incompatible condition state in binary form.

18. The apparatus of claim 17, further comprising:
means for identifying the transformed integer value from the generated array of transformed integer values corresponding with each of the one or more initial values.

19. The method of claim 18, further comprising:
means for redundantly identifying the transformed integer value from the generated array of transformed integer values corresponding with each of the one or more initial values; and
means for comparing the redundantly identified transformed integer values with the corresponding identified transformed integer values.

20. The method of claim 19, further comprising:
means for taking remedial action if one or more of the redundantly identified transformed integer values is not equal to the corresponding identified transformed integer value.

\* \* \* \* \*